(12) United States Patent
Stanyon

(10) Patent No.: US 11,515,694 B2
(45) Date of Patent: Nov. 29, 2022

(54) STIFFENING MEMBER AND PROTECTIVE HOUSING ASSEMBLY

(71) Applicant: SUBSEA ENERGY SOLUTIONS LIMITED, Catterick Garrison (GB)

(72) Inventor: Philip Stanyon, Catterick Garrison (GB)

(73) Assignee: Subsea Energy Solutions Ltd, Catterick Garrison (GB)

( * ) Notice: Subject to any disclaimer, the term of this patent is extended or adjusted under 35 U.S.C. 154(b) by 176 days.

(21) Appl. No.: 16/767,974

(22) PCT Filed: Nov. 27, 2018

(86) PCT No.: PCT/GB2018/053422
§ 371 (c)(1),
(2) Date: May 28, 2020

(87) PCT Pub. No.: WO2019/106352
PCT Pub. Date: Jun. 6, 2019

(65) Prior Publication Data
US 2020/0373748 A1    Nov. 26, 2020

(30) Foreign Application Priority Data
Nov. 28, 2017 (GB) ..................... 1719780

(51) Int. Cl.
*H02G 3/08* (2006.01)
*F03D 13/25* (2016.01)
(Continued)

(52) U.S. Cl.
CPC .............. *H02G 3/083* (2013.01); *E02B 17/00* (2013.01); *E02B 2017/0091* (2013.01);
(Continued)

(58) Field of Classification Search
CPC ....... F16L 27/11; F16L 51/025; F16L 27/026; F16L 27/111; F16L 27/1004; F16L 33/01;
(Continued)

(56) References Cited

U.S. PATENT DOCUMENTS 616,672 A * 12/1898 Kelling ................ A61B 1/0055
600/142
680,328 A * 8/1901 Henderson .............. F16L 27/11
285/226
(Continued)

FOREIGN PATENT DOCUMENTS

EP          0645573         3/1995
EP          2017443         1/2009
(Continued)

OTHER PUBLICATIONS

International Search Report and Written Opinion, Application No. PCT/GB2018/053422, dated Feb. 20, 2019, 10 pages.

*Primary Examiner* — Krystal Robinson
(74) *Attorney, Agent, or Firm* — Patterson, Thuente, Pedersen, P.A.

(57) ABSTRACT

A stiffening member for a protective housing assembly which defines a bore for receiving a utility line. The housing assembly includes a first body member, and a second body member arranged adjacent to one another to define immediately adjacent sections of the bore which surrounds the utility line. The stiffening member includes a first side for engagement with the first body member, and a second side for engagement with the second body member wherein pedestals extend from the first side of the stiffening member in a first direction away from the second side.

21 Claims, 10 Drawing Sheets

(51) Int. Cl.
*F03D 80/80* (2016.01)
*E02B 17/00* (2006.01)

(52) U.S. Cl.
CPC ...... *E02B 2017/0095* (2013.01); *F03D 13/25* (2016.05); *F03D 80/85* (2016.05)

(58) Field of Classification Search
CPC ... F16L 1/26; F16L 25/01; F16L 27/00; F16L 27/0849; F16L 33/26; F16L 47/18; F16L 51/027; F16L 1/06; F16L 11/083; F16L 33/224; F16L 35/00; F16L 55/1608; F16L 1/15; F16L 11/18; F16L 27/04; F16L 33/222; F16L 55/07; F16L 55/26; F16L 55/32; F16L 1/036; F16L 11/00; F16L 11/15; F16L 2101/30; F16L 2201/00; F16L 2201/10; F16L 3/1091; F16L 33/225; F16L 51/024; F16L 55/28; F16L 55/38; F16L 59/143; F16L 59/15; F16L 1/032; F16L 11/04; F16L 11/082; F16L 11/085; F16L 11/088; F16L 11/115; F16L 11/20; F16L 11/22; F16L 17/04; F16L 23/06; F16L 27/10; F16L 27/1021; F16L 3/11; F16L 33/22; F16L 33/24; F16L 37/091; F16L 37/096; F16L 37/098; F16L 37/56; F16L 39/02; F16L 47/32; F16L 51/026; F16L 51/028; F16L 55/00; F16L 9/003; F16L 1/16; F16L 1/161; F16L 1/19; F16L 1/203; F16L 1/24; F16L 11/12; F16L 11/122; F16L 15/008; F16L 15/08; F16L 19/061; F16L 19/065; F16L 19/086; F16L 21/005; F16L 2101/16; F16L 23/02; F16L 25/0036; F16L 27/053; F16L 27/073; F16L 27/0857; F16L 27/1017; F16L 27/108; F16L 3/00; F16L 3/08; F16L 3/10; F16L 3/12; F16L 33/00; F16L 33/006; F16L 33/02; F16L 33/2078; F16L 33/28; F16L 37/0841; F16L 37/0985; F16L 37/1215; F16L 37/133; F16L 37/26; F16L 41/021; F16L 5/08; F16L 5/10; F16L 51/04; F16L 55/04; F16L 55/163; F16L 55/1645; F16L 55/1658; F16L 55/168; F16L 55/179; F16L 55/18; F16L 55/24; F16L 55/265; F16L 55/36; F16L 55/46; F16L 59/153; F16L 9/125; F16L 9/16; F16L 9/19; F16L 9/22; F16L 1/163; F16L 1/166; F16L 1/201; F16L 11/10; F16L 11/11; F16L 11/121; F16L 11/14; F16L 13/106; F16L 13/143; F16L 15/003; F16L 15/007; F16L 15/02; F16L 19/005; F16L 19/0206; F16L 19/0218; F16L 19/07; F16L 2011/047; F16L 21/00; F16L 21/007; F16L 21/03; F16L 21/06; F16L 2201/30; F16L 23/032; F16L 23/04; F16L 23/18; F16L 25/009; F16L 25/12; F16L 27/02; F16L 27/0816; F16L 27/0828; F16L 27/1012; F16L 27/107; F16L 27/12; F16L 27/125; F16L 27/127; F16L 27/12751; F16L 3/015; F16L 33/03; F16L 33/2075; F16L 33/2076; F16L 33/223; F16L 37/002; F16L 37/008; F16L 37/04; F16L 37/0842; F16L 37/086; F16L 37/088; F16L 37/0925; F16L 37/0926; F16L 37/122; F16L 37/1225; F16L 37/127; F16L 37/148; F16L 37/22; F16L 37/248; F16L 37/252; F16L 37/32; F16L 37/34; F16L 37/40; F16L 37/54; F16L 37/62; F16L 41/03; F16L 41/14; F16L 45/00; F16L 47/04; F16L 47/16; F16L 47/20; F16L 47/26; F16L 5/06; F16L 51/00; F16L 51/005; F16L 51/029; F16L 51/03; F16L 53/70; F16L 55/005; F16L 55/02; F16L 55/165; F16L 55/34; F16L 57/02; F16L 58/1054; F16L 59/022; F16L 59/121; F16L 59/20; F16L 59/21; F16L 7/02; H02G 9/025; H02G 3/03; H02G 3/081; H02G 15/113; H02G 15/115; H02G 3/088; H02G 1/1248; H02G 3/0481; H02G 3/30; H02G 1/005; H02G 1/12; H02G 1/16; H02G 15/003; H02G 15/02; H02G 15/068; H02G 15/18; H02G 3/00; H02G 3/083; H02G 7/20; H02G 3/04; H02G 3/0487
See application file for complete search history.

(56) References Cited

U.S. PATENT DOCUMENTS

| | | | | |
|---|---|---|---|---|
| 1,347,470 | A | * | 7/1920 | Bard ............... F16L 27/073 285/271 |
| 1,475,090 | A | * | 11/1923 | Walter ............... F16L 1/161 285/261 |
| 2,564,938 | A | * | 8/1951 | Warren ............ F16L 27/047 285/95 |
| 2,850,299 | A | * | 9/1958 | Risley ............. F16L 25/023 285/48 |
| 3,030,130 | A | * | 4/1962 | Appleton ........... F16L 33/224 285/248 |
| 3,139,115 | A | * | 6/1964 | Bawcon ............ F16L 51/024 138/121 |
| 3,197,954 | A | * | 8/1965 | Merker ............. F16L 3/015 59/78.1 |
| 3,330,105 | A | * | 7/1967 | Weber ............... B66C 13/12 59/78.1 |
| 3,650,550 | A | * | 3/1972 | West ............... B29C 63/346 285/55 |
| 3,770,022 | A | * | 11/1973 | Beisemann ......... F16L 3/015 138/108 |
| 3,848,407 | A | * | 11/1974 | Moritz ............. F16G 13/16 59/78.1 |
| 3,921,388 | A | * | 11/1975 | Loos ............... F16G 13/16 59/78.1 |
| 4,101,150 | A | * | 7/1978 | Thawley ............ E02F 7/10 285/226 |
| 4,104,871 | A | * | 8/1978 | Moritz ............. F16G 13/16 248/49 |
| 4,220,180 | A | * | 9/1980 | Koga ............... F16L 27/107 138/109 |
| 4,360,104 | A | * | 11/1982 | Lang ............... A61M 16/08 128/204.18 |
| 4,384,594 | A | * | 5/1983 | Moritz ............. H02G 11/006 138/120 |
| 4,625,936 | A | * | 12/1986 | Hadden, Sr. ....... B25J 9/06 138/120 |
| 4,727,908 | A | * | 3/1988 | Forster ............ H02G 11/006 138/120 |
| 5,463,187 | A | * | 10/1995 | Battle ............. F16L 7/00 138/111 |
| 5,992,896 | A | * | 11/1999 | Davey ............. F01N 13/1811 285/226 |
| 6,016,844 | A | * | 1/2000 | Takahashi ......... F16G 13/16 138/120 |
| 6,029,437 | A | * | 2/2000 | Hart ............... F16G 13/16 248/49 |
| 6,129,120 | A | * | 10/2000 | Margot ............ H02G 3/0468 138/121 |

(56) References Cited

U.S. PATENT DOCUMENTS

| | | | | |
|---|---|---|---|---|
| 6,161,373 A * | 12/2000 | Heidrich | | F16G 13/16 |
| | | | | 248/49 |
| 6,311,736 B2 * | 11/2001 | Herman | | B21C 37/124 |
| | | | | 138/131 |
| 6,695,014 B2 * | 2/2004 | Blase | | H02G 11/006 |
| | | | | 138/120 |
| 6,708,480 B1 * | 3/2004 | Wehler | | F16G 13/16 |
| | | | | 248/49 |
| 6,715,799 B2 * | 4/2004 | Hardy | | F16L 11/15 |
| | | | | 285/223 |
| 6,859,956 B2 * | 3/2005 | Mantyla | | E03C 1/284 |
| | | | | 137/247.23 |
| 7,253,361 B2 * | 8/2007 | Nishijima | | H02G 3/0468 |
| | | | | 174/72 A |
| 7,418,812 B2 * | 9/2008 | Ikeda | | F16G 13/16 |
| | | | | 59/78.1 |
| 7,469,722 B2 * | 12/2008 | Berland | | H01R 13/562 |
| | | | | 138/110 |
| 8,388,520 B2 * | 3/2013 | Stefanchik | | A61B 1/00078 |
| | | | | 600/144 |
| 8,622,481 B2 * | 1/2014 | Niederriter | | G02B 6/4461 |
| | | | | 299/43 |
| 9,198,561 B2 * | 12/2015 | Smith | | A61M 25/0147 |
| 9,364,230 B2 * | 6/2016 | Shelton, IV | | A61B 17/07207 |
| 9,809,179 B2 * | 11/2017 | Inoue | | H02G 3/0406 |
| 9,810,349 B2 * | 11/2017 | Lee | | F16L 11/18 |
| 10,028,744 B2 * | 7/2018 | Shelton, IV | | A61B 17/0644 |
| 10,377,327 B1 * | 8/2019 | Katoh | | H02G 11/00 |
| 2001/0025715 A1 * | 10/2001 | Muller | | F16L 3/26 |
| | | | | 174/19 |
| 2001/0048989 A1 * | 12/2001 | Fukui | | F16L 11/16 |
| | | | | 428/36.1 |
| 2001/0054820 A1 * | 12/2001 | Starita | | F16L 25/0054 |
| | | | | 285/364 |
| 2002/0043591 A1 * | 4/2002 | Sakai | | H02G 11/006 |
| | | | | 248/49 |
| 2002/0161281 A1 * | 10/2002 | Jaffe | | A61B 5/065 |
| | | | | 600/114 |
| 2002/0167167 A1 * | 11/2002 | Elder | | B29C 45/0017 |
| | | | | 285/261 |
| 2003/0042040 A1 * | 3/2003 | Komiya | | H02G 11/006 |
| | | | | 174/72 A |
| 2003/0184086 A1 * | 10/2003 | Christianson | | F16L 11/18 |
| | | | | 285/146.1 |
| 2004/0108127 A1 * | 6/2004 | Aoki | | B60R 16/0215 |
| | | | | 174/72 A |
| 2005/0006894 A1 * | 1/2005 | Karasawa | | F16L 37/138 |
| | | | | 285/146.1 |
| 2005/0023037 A1 * | 2/2005 | Camp | | E21B 7/067 |
| | | | | 175/61 |
| 2005/0038318 A1 * | 2/2005 | Goldwasser | | A61B 1/018 |
| | | | | 600/104 |
| 2005/0082824 A1 * | 4/2005 | Luettgen | | H01R 35/00 |
| | | | | 285/146.1 |
| 2005/0242574 A1 * | 11/2005 | Cowie | | F16L 25/10 |
| | | | | 285/146.1 |
| 2005/0250990 A1 * | 11/2005 | Le | | A61B 1/31 |
| | | | | 600/114 |
| 2007/0068694 A1 * | 3/2007 | Utaki | | H02G 11/006 |
| | | | | 174/19 |
| 2010/0069715 A1 * | 3/2010 | Perry | | A61B 1/00154 |
| | | | | 600/114 |
| 2011/0132638 A1 * | 6/2011 | Oga | | B60R 16/0215 |
| | | | | 174/135 |
| 2012/0261184 A1 * | 10/2012 | Kitamura | | H02G 3/0468 |
| | | | | 174/72 A |
| 2012/0267164 A1 * | 10/2012 | Reuss | | H02G 3/0487 |
| | | | | 174/70 R |
| 2014/0020358 A1 * | 1/2014 | Blase | | H02G 3/0475 |
| | | | | 59/78.1 |
| 2014/0345739 A1 * | 11/2014 | Graham | | F16L 11/18 |
| | | | | 138/120 |
| 2016/0109046 A1 * | 4/2016 | Lee | | F16L 9/22 |
| | | | | 285/261 |
| 2018/0097348 A1 * | 4/2018 | Zurovec | | G01V 3/3808 |
| 2018/0209576 A1 * | 7/2018 | Whitefield | | H02G 9/12 |
| 2021/0364548 A1 * | 11/2021 | Iadanza | | H02G 9/025 |

FOREIGN PATENT DOCUMENTS

| | | |
|---|---|---|
| GB | 2316461 A | 2/1998 |
| GB | 2513387 | 10/2014 |
| WO | WO 2010/136801 | 12/2010 |
| WO | WO 2015/071684 | 5/2015 |

* cited by examiner

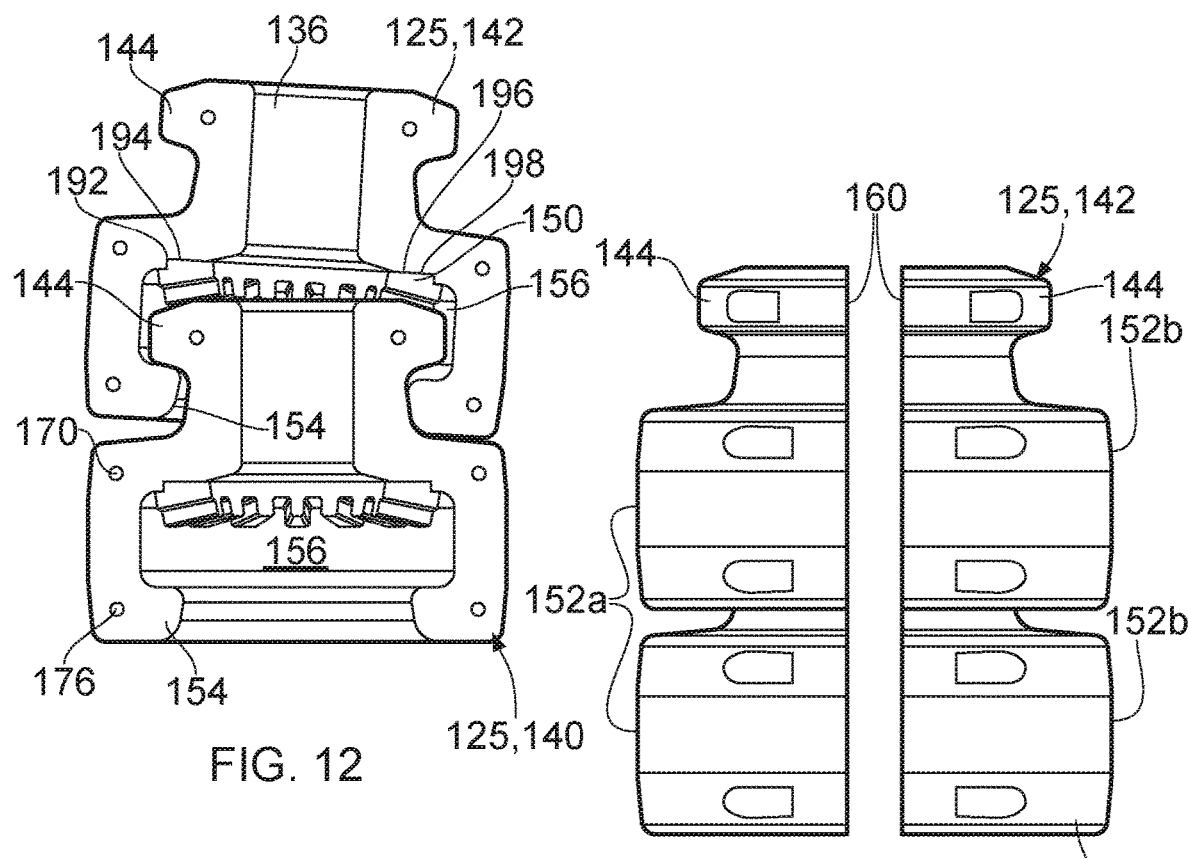
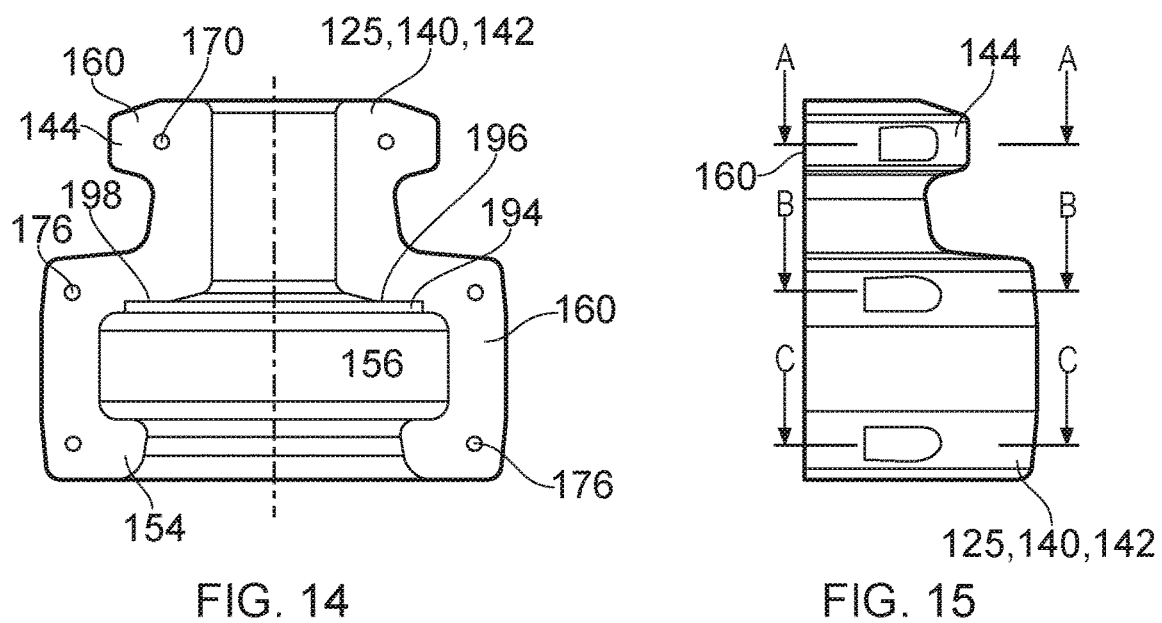

STIFFENING MEMBER AND PROTECTIVE HOUSING ASSEMBLY

PRIORITY CLAIM

The present application is a National Phase entry of PCT Application No. PCT/GB2018/053422, filed Nov. 27, 2018, which claims priority from GB Patent Application No. 1719780.7, filed Nov. 28, 2017, each of which is hereby fully incorporated herein by reference.

TECHNICAL FIELD

The present disclosure relates to a stiffening member for use in a protective housing. In particular the disclosure is concerned with, but not limited to, a stiffening member and protective housing assembly which defines a bore for receiving a utility line for an offshore wind turbine.

BACKGROUND

Utility lines may contain cables for exporting electricity from offshore wind turbines, and control wires or fiber optic communication cores for control of the turbines. Protection of subsea utility lines from damage is thus a key consideration for offshore wind farms.

FIG. 1 shows a wind turbine structure 10 located on a monopile 12 which extends into a sea bed 14. A utility line 16 extends from a generator 18 in a turbine housing 20. The cable 16 extends down the length of the monopile 12 and out through an orifice 22 in the wall of the monopile 12, extending along the sea bed 14 to shore. The utility line 16 has a tendency to bend under its own weight and as a result of the force induced upon it by the movement of water in which it is submerged.

Housings are often provided along a length of the utility line 16 from the monopile 12 to the sea bed 14 to protect the utility line from damage. The housings comprise hard articulated arrangements so they may flex along their length. However, often the bending forces on the housing are so high that the housing is over stressed and induces forces on the utility line. Additionally or alternatively, the housing may be bent into such a shape that the utility line is supporting the weight of the housing as well as its own weight, thereby over loading the utility line and risking damage.

As will be appreciated, fixing or replacing subsea utility lines is difficult and expensive.

Hence components for a housing, and the housing they form, which inherently resist "over bend" compared to examples of the related art, are highly desirable. Such a structure would thus be configured to support its own weight as well as supporting and protecting the utility line.

SUMMARY

According to the present disclosure there is provided apparatus and method as set forth in the appended claims. Other features of the disclosure will be apparent from the dependent claims, and the description which follows.

Accordingly there may be provided a stiffening member for a protective housing assembly which defines a bore for receiving a utility line. The housing assembly may comprise: a first body member, and a second body member arranged adjacent to one another to define immediately adjacent sections of the bore which surrounds the utility line. The stiffening member may comprise a first side for engagement with the first body member, and a second side for engagement with the second body member wherein pedestals extend from the first side of the stiffening member in a first direction away from the second side.

The second side of the stiffening member may be substantially planar.

The second side of the stiffening member may be provided with a seating shoulder for engagement with a seating recess provided in the first body member.

Pedestals may extend from the second side of the stiffening member in a second direction away from the first side.

Each pedestal on one side of the stiffening member may be aligned with a pedestal on the other side of the stiffening member.

The stiffening member may be provided as a ring segment configured to form a complete ring around the bore of the housing when assembled with at least one other similar stiffening member.

The stiffening member may be ring shaped.

The pedestals may be provided as radially extending teeth members.

The pedestals may be evenly spaced around the side of the stiffening member from which they extend.

The stiffening member may be made from a resilient material having a hardness less than the hardness of the body members.

There may also be provided a protective housing assembly which defines a bore for receiving a utility line. The housing assembly may comprise a first body member, and a second body member arranged adjacent to one another to define immediately adjacent sections of the bore which surrounds the utility line, and a stiffening member according to the present disclosure located between each of the first body member and second body member.

The body members may be provided with an outwardly projecting flange at each end, the stiffening member located between, and in contact with, one end of each body member the housing further comprises a clamp member which extends around one end flange of each body member to thereby hold the body members and stiffening member together.

At least one of the body members may comprise a continuous wall which defines the bore and flanges.

The clamp member may comprise radially inwardly extending flanges configured to capture the radially outwardly extending flanges of the body members to thereby hold the body members and stiffening member together.

The clamp member may comprise at least one pair of mating surfaces which may be separated such that the clamp member may be located, or removed from, around the body members.

The clamp member may comprise two removable sections, each having a pair of mating surfaces.

The clamp member may be provided with releasable engagement features configured to hold the mating surfaces together, and to allow the mating surfaces to be divided.

The body members may be provided with an outwardly projecting flange at one end, and an inwardly projecting flange at their other end which defines an opening to a cavity within the body member. The stiffening member may be located between, and in contact with, the end of the outwardly projecting flange, and a surface of the cavity spaced apart from the inwardly projecting flange. The inwardly projecting flange may be configured to extend around the outwardly projecting flange such that the outwardly projecting flange of one body member sits in the cavity of the other body member to thereby hold the body members and stiffening member together.

The cavity surface may comprise a seating recess configured to receive the stiffening member seating shoulder.

Each of the body members may comprise at least one pair of mating surfaces which may be separated such that said body member may be located, or removed from, around the other body member.

The body member may comprise two removable sections, each having a pair of mating surfaces.

Each body member may be provided with releasable engagement features configured to hold the mating surfaces together, and to allow the mating surfaces to be divided.

There may also be provided a method of assembling a protective housing for a utility line according to the present disclosure comprising providing a utility line, bringing the first body member and second body member together to trap the stiffening member therebetween, and hold the body members and stiffening member together and thereby provide the housing around the utility line.

Hence there may be provided a stiffening member for a protective housing assembly which defines a bore for receiving a utility line, a protective housing which comprises the stiffening member, and a method of assembling a protective housing having the stiffening member, with segments comprising body members which can pivot relative to one another, but which are prevented from pivoting beyond a predetermined angle. Hence the housing is inherently unable to form a curve having a radius below a predetermined value, thus ensuring the utility line carries less bending load than configurations of the related art, and ensuring the housing supports most, or all, of its own weight.

BRIEF DESCRIPTION OF THE DRAWINGS

Examples of the present disclosure will now be described with reference to the accompanying drawings, in which:

FIG. 12 shows a view of joining surfaces of an assembled element of the housing example shown in FIGS. 10, 11.

FIG. 13 shows a side view of the element of FIG. 12, in part exploded view.

FIGS. 14, 15 show the joining surfaces and side view of an element shown in FIG. 12.

DETAILED DESCRIPTION

Figure 1:
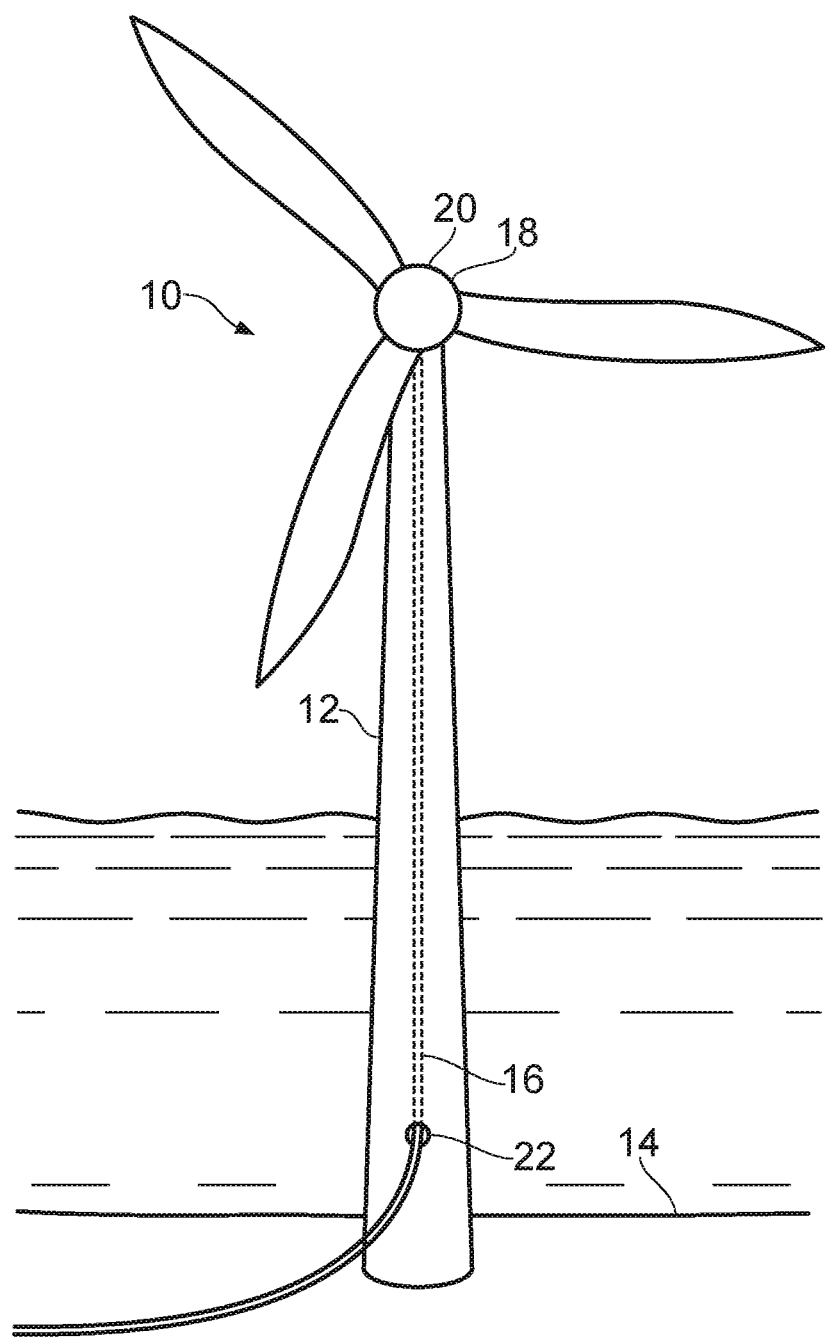
FIG. 1 shows an offshore wind turbine structure, as previously described.
Figure 2:
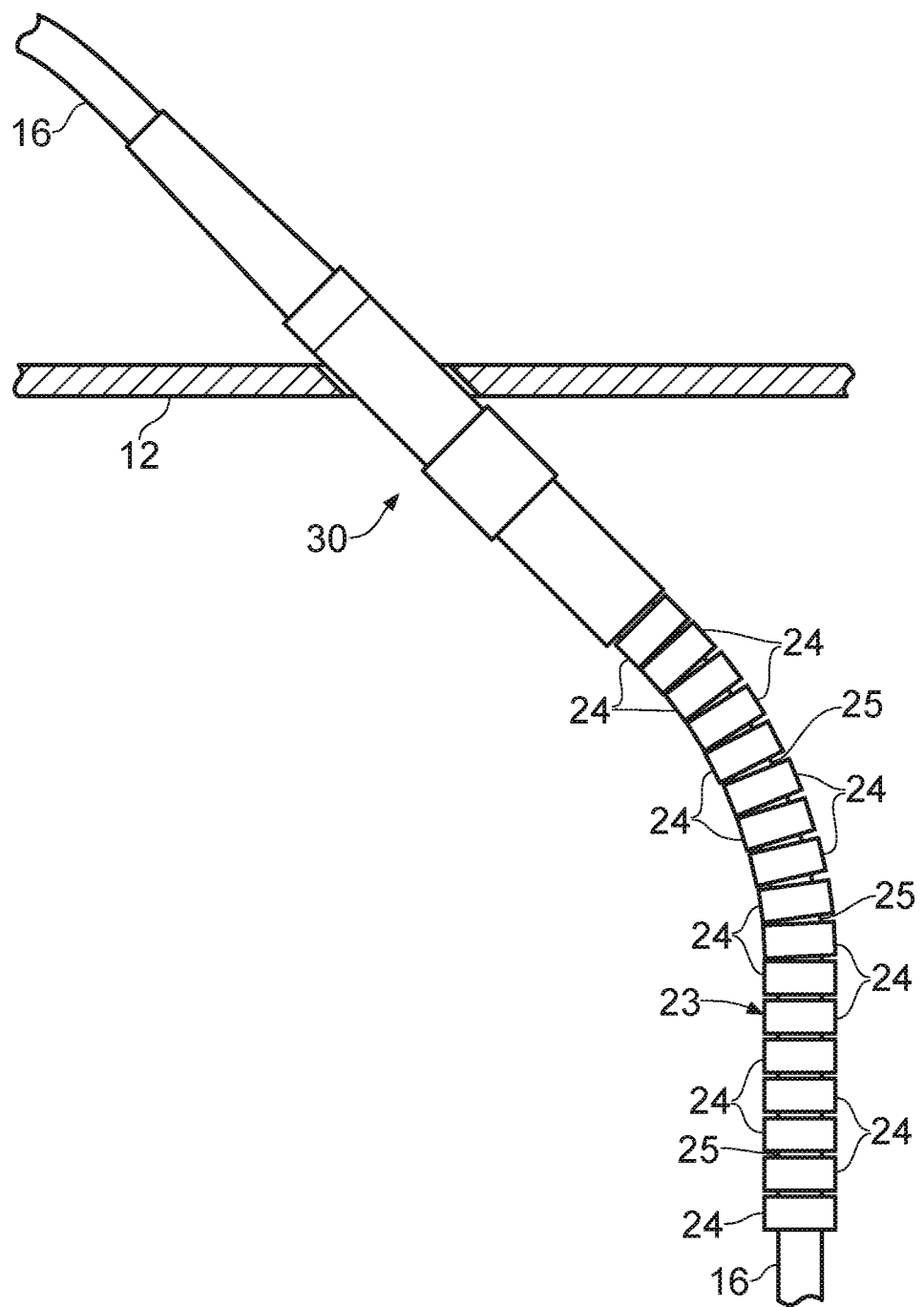
FIG. 2 shows a cross section of a region of the wind turbine structure fitted with a housing according to the present disclosure.

FIG. 2 shows a region of a monopile 12, as shown in FIG. 1, in which the orifice 22 is located. The utility line 16 is shown with a housing 23. Shown in FIG. 2 is a mount 30 which anchors the utility line 16 and housing 23 into the orifice 22. The mount 30 is not part of the device of the present disclosure, and will not be described further.

However, the housing 23 may comprise a number of clamp members 24 which clamp around adjacent body members 25, as shown in the examples of FIGS. 2 to 9. Alternatively the housing members may comprise substantially similar body members 125 which clamp around and/or fit within adjacent body members as shown in the examples of FIGS. 10 to 20.

In both examples there is provided a protective housing assembly which defines a bore for receiving a utility line. The housing assembly comprises a first body member, and a second body member arranged adjacent to one another to define immediately adjacent sections of the bore which surrounds the utility line.

In both examples there is also provided a stiffening member as part of the protective housing assembly. The stiffening member according to the present disclosure is located between each of the first body member and second body member. The stiffening member comprises a first side for engagement with the first body member, and a second side for engagement with the second body member. Pedestals extend from the first side of the stiffening member in a first direction away from the second side.

In both examples, the housing distributes bending loads along the utility line 16 to prevent damage to the utility line 16.

Figure 3:
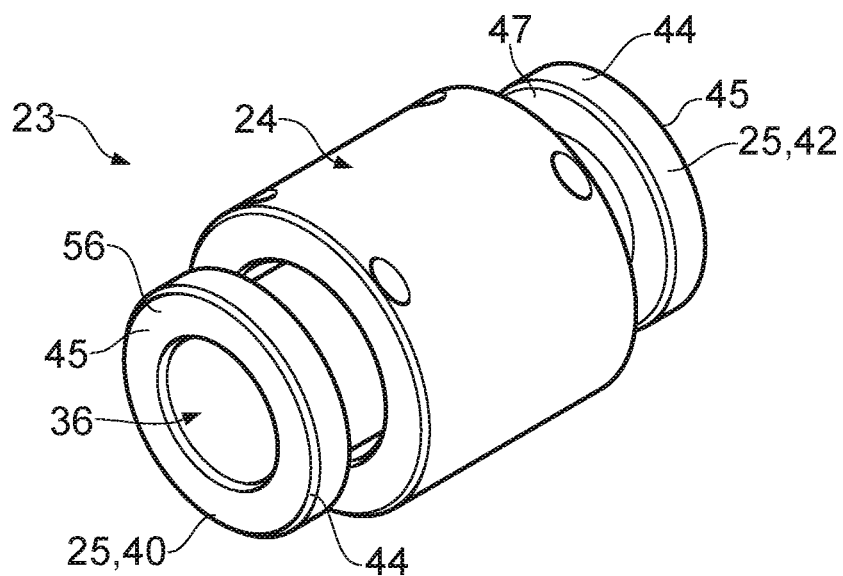
FIG. 3 shows an assembled section of a housing according to the present disclosure for a utility line.
Figure 4:
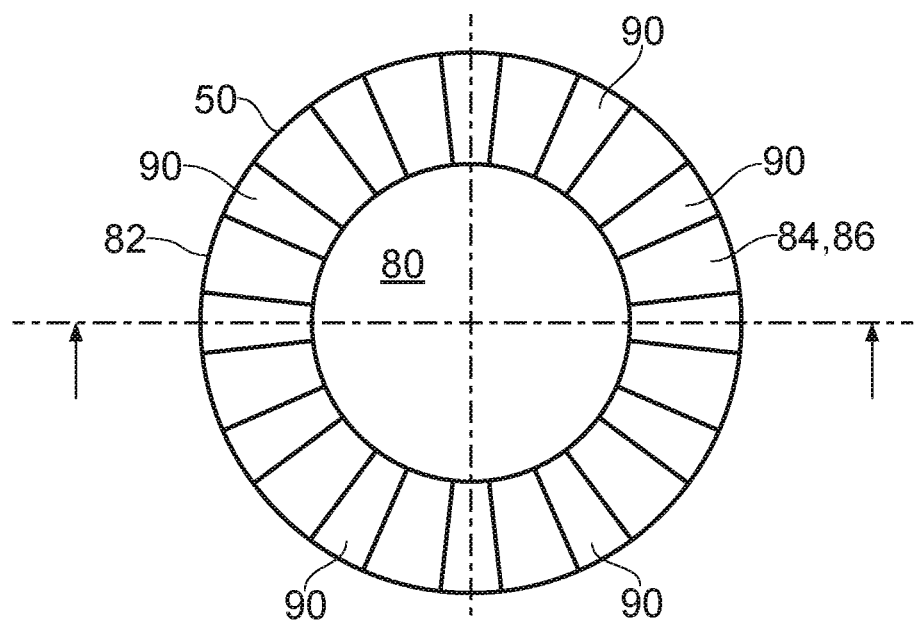
FIGS. 4, 5 show a plan and section view respectively of a stiffening member according to the present disclosure.
Figure 5:
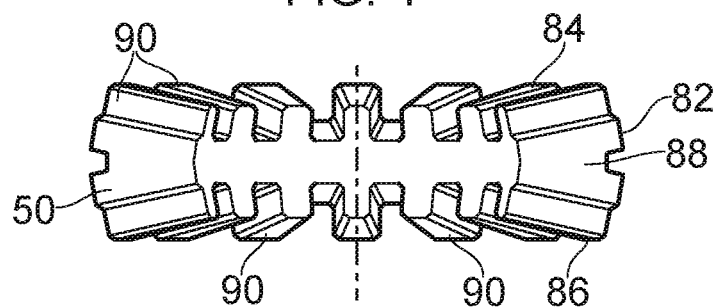
Figure 6:
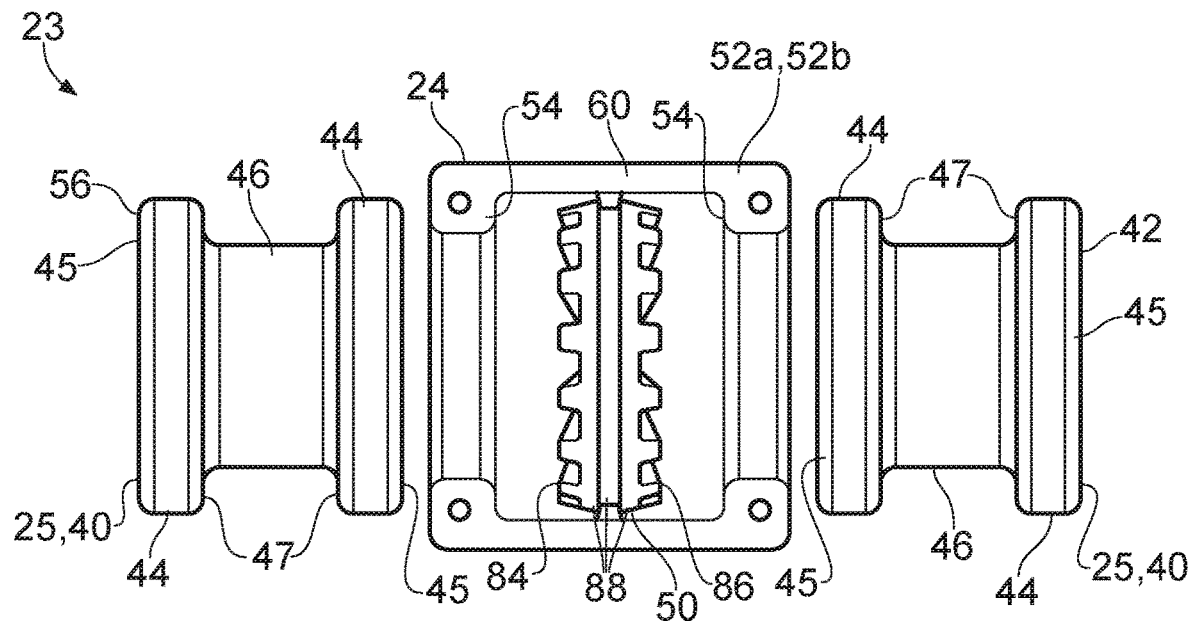
FIG. 6 shows an exploded view of the element shown in FIG. 3.
Figure 7:
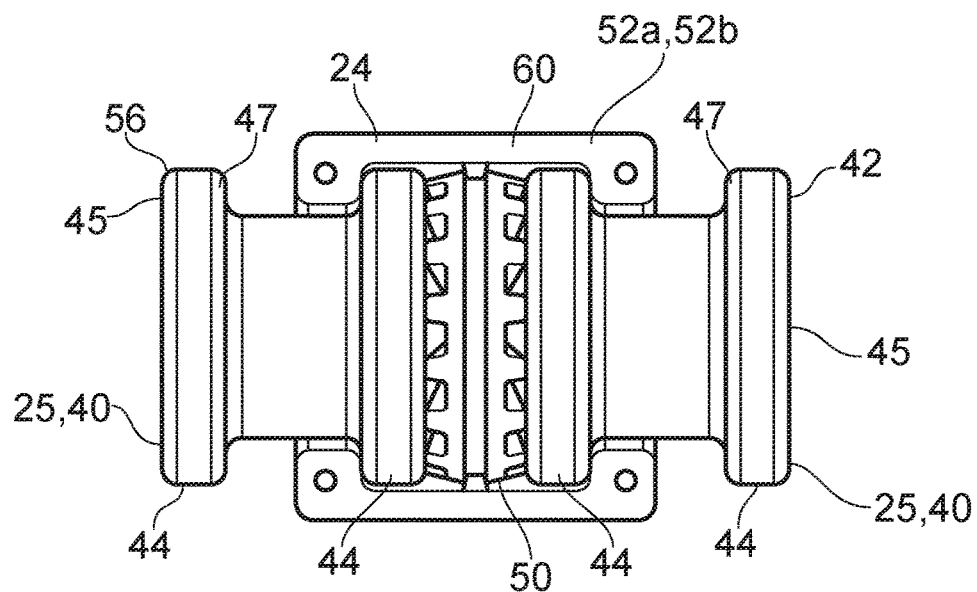
FIG. 7 shows an assembly of the features shown in FIG. 6.
Figure 8:
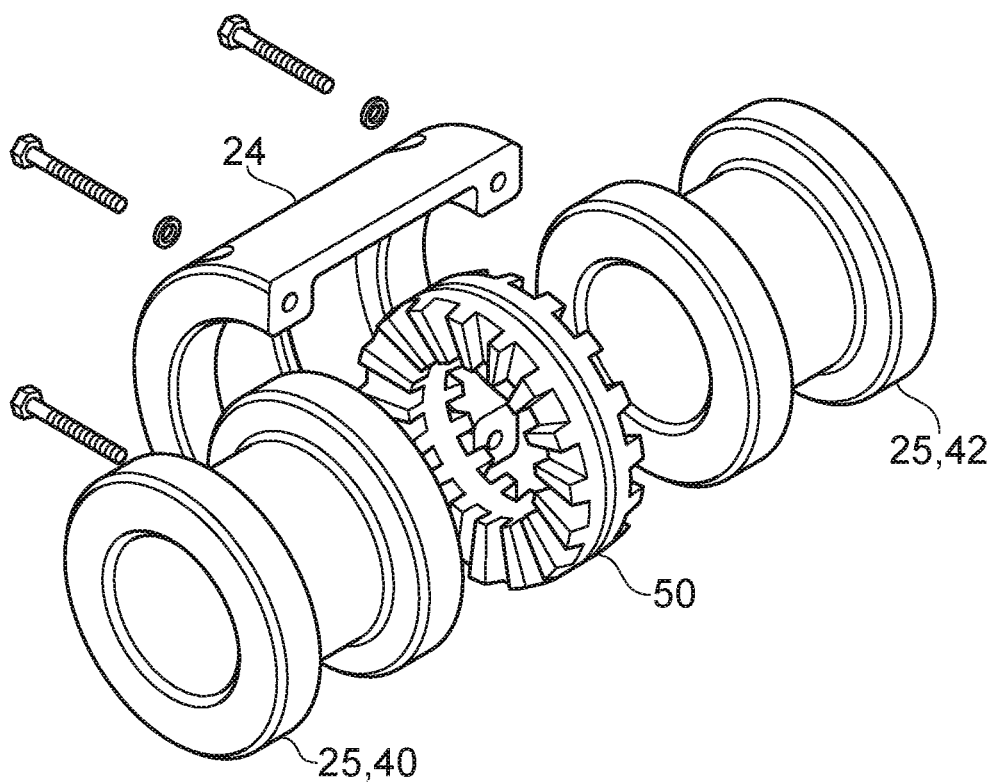
FIG. 8 shows a perspective view of FIG. 6.
Figure 9:
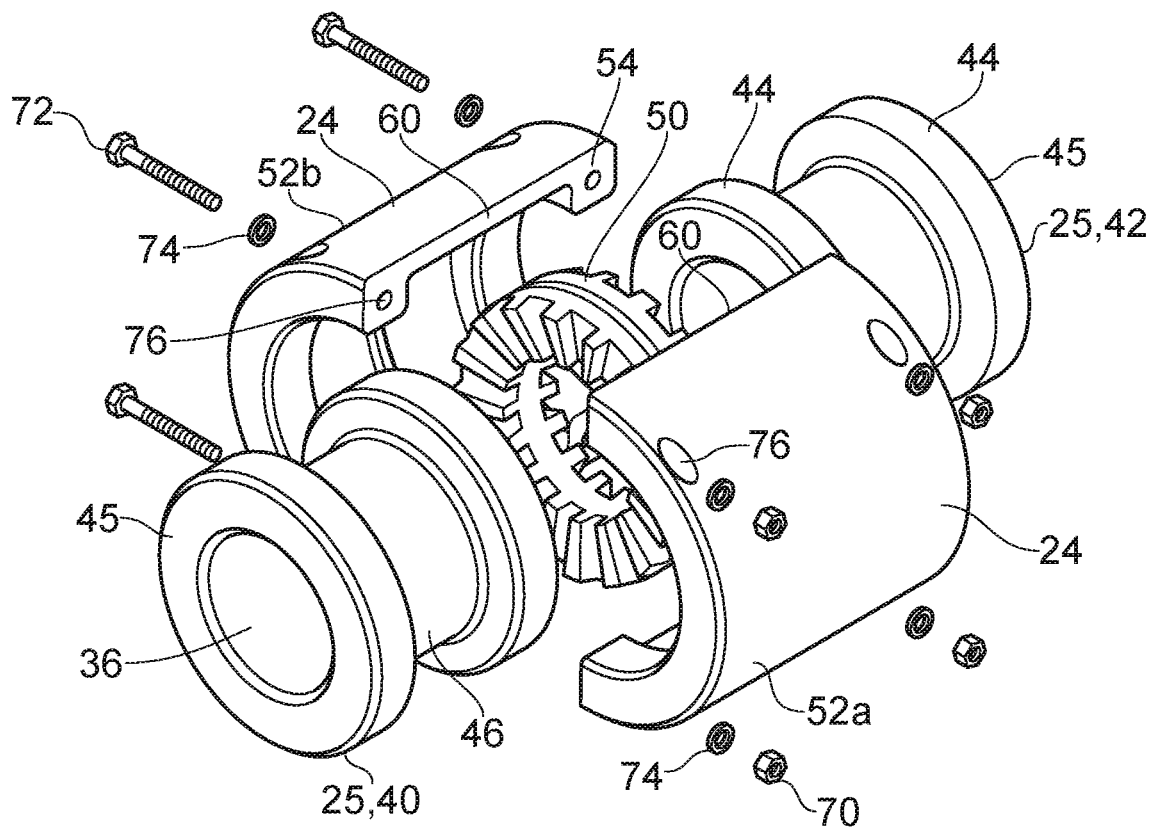
FIG. 9 shows an exploded view of FIG. 3.

FIGS. 4, 5 show a plan and section view respectively of an example of a stiffening member 50 according to the present disclosure. FIG. 6 shows an exploded view of the element shown in FIG. 3. FIG. 7 shows an assembly of the features shown in FIG. 6. FIG. 8 shows a perspective view of FIG. 6, and FIG. 9 shows an exploded view of FIG. 3.

As best shown in FIG. 3, the housing 23 defines a bore 36 for receiving the utility line 16. The housing 23 comprises at least two longitudinally arranged body members 25, shown as individual body member elements 40, 42 (that is to say a first body member 40 and a second body member 42) which, when assembled, define immediately adjacent sections of the bore 36. In the example shown, the first body member 40 and second body member 42 are identical. That is to say, in the example shown, the body members 40, 42 are of the same size and geometry.

As shown in FIGS. 6 to 9, the body members 40, 42 are provided with a radially outwardly projecting flange 44 at opposite ends. That is to say, each body member 40, 42 has a central region 46 with parallel sides with a radially outwardly extending flange/shoulder 44 provided at each end of the central region 46. The flanges 44 have a surface which defines an end face 45 of the body members 40, 42. The flanges also have a rear face 47 which face each other across the central region 46, and are provided on an opposite face of the flange 44 to the end face 45.

In the example shown the body members 40, 42 comprise a continuous wall which defines the bore 36 and flanges 44. That is to say, the body members 40, 42 may be continuous and comprise only one piece, rather than being a fabrication made of several pieces. The body members 40, 42 may be molded in one piece, for example from polyurethane.

The stiffening member 50 is located between, and in contact with, one end of each body member 25, 40, 42. That is to say the stiffening member 50 is provided against an end face 45 of one of the flanges 44 of one of the body members 40, and against an end face 45 of a flange 44 of the other body member 42. Hence when assembled, the stiffening member 50 provides a short section of the bore surface 36 which extends between the body members 40, 42. Put another way, when assembled and the stiffening member 50 is located between, and in contact with, the ends 45 of each body member 40,42, the body members 40,42 and stiffening member 50 form a substantially continuous bore surface 36 that surrounds the utility line 16. That is to say, the bore surface 36 is formed only by the body members 40, 42 and stiffening member 50.

As shown in FIGS. 4, 5, the stiffening member 50 comprises a first side 84 for engagement with the first body member 40, and a second side 86 for engagement with the second body member 42. The stiffening member 50 is ring shaped.

The stiffening member 50 defines a central aperture 80 having a first diameter, and an outer circumference 82 having a second diameter, the second diameter being greater than the first diameter. The first side 80 is separated from the second side by wall 88 (or main body). Put another way, the stiffening member 50 is provided as a ring shaped disc.

Pedestals 90 (that is to say, castellations, ribs, walls, pillars or teeth members) extend from the first side 84 of the stiffening member 50 in a first direction away from the second side 86. In the present example, pedestals 90 also extend from the second side 86 of the stiffening member 50 in a second direction away from the first side 84.

Each pedestal 90 on one side of the stiffening member 50 is aligned with a pedestal 90 on the other side of the stiffening member 50. The pedestals 90 are provided as radially extending teeth members. The pedestals 90 may extend all of the way from the bore 80 (central aperture) to the outer circumference 82 of the stiffening member 50.

As shown in FIGS. 4, 5, the pedestals 90 are evenly spaced around the side of the stiffening member 50 from which they extend.

Figure 21:
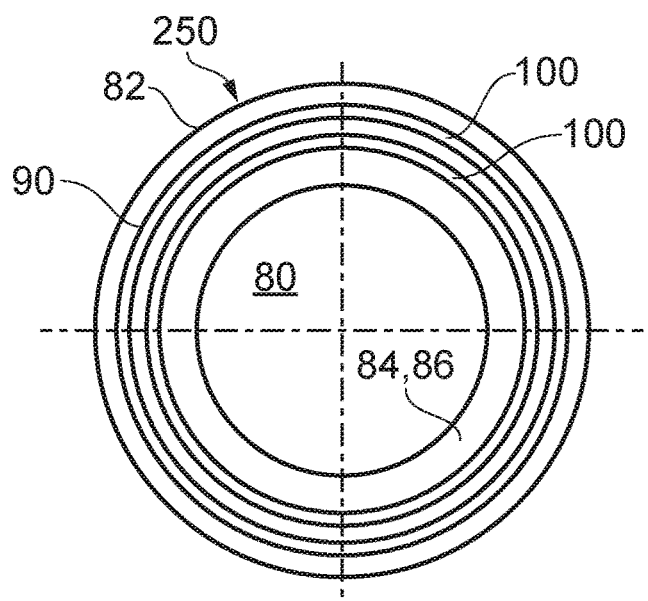
FIGS. 21 to 23 show a plan view of an alternative example, to that shown in FIG. 4, of a stiffening member.

In an alternative example, shown in FIG. 21, the pedestals 90 are provided as walls 100 which extend in an arc (e.g. a circle) around the first side 84 and/or second side 86. That is to say, as shown in FIG. 21, in which the stiffening member 50 is provided as a ring shape, the pedestals 90 may extend as a continuous circular (i.e. ring shaped) wall 100 around the first side 84 and/or second side 86, the circles/rings formed by the walls 100 being co-axial and concentric with the stiffening member 50. A single continuous circular wall 100 may be provided, or multiple continuous circular walls may be provided. In examples in which multiple continuous circular walls are provided, they may be co-axial and/or concentric with one another, and hence form circles of different diameters. In examples in which multiple co-axial and/or concentric walls 100 are provided, the walls 100 are spaced apart from one another.

Figure 22:
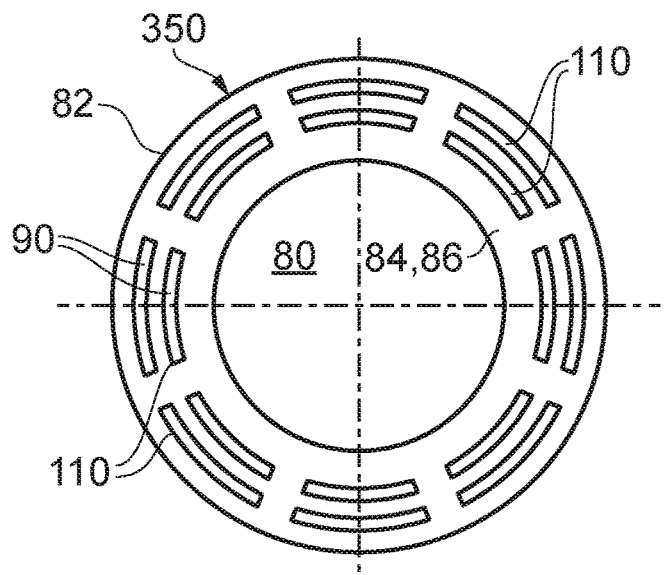
Figure 23:
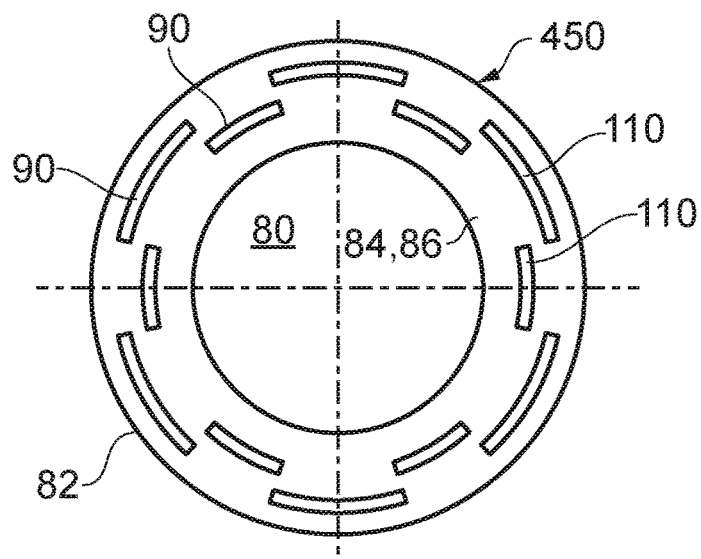

In a further alternative example, shown in FIGS. 22, 23, the pedestals 90 are provided as arcuate walls 110 which extend in an arc around the first side 84 and/or second side 86. That is to say, as shown in FIGS. 22, 23, in which the stiffening member 50 is provided as a ring shape, the pedestals 90 may be provided as an array of spaced apart arcuate walls 110 which extend around the first side 84 and/or second side 86 on a common Pitch Circle Diameter (PCD). A single array of arcuate walls 110 may be provided. In an alternative example two or more co-axial and/or concentric arrays of arcuate walls 110, arranged on co-axial and/or concentric pitch circle diameters, may be provided. Hence the arcuate walls 110 are spaced apart from one another around their respective pitch circle diameter. In examples in which multiple co-axial and/or concentric arrays are provided, the arrays (i.e. the pitch circle diameters) are spaced apart from one another.

The arcuate walls 110 of each array may be aligned as shown in FIG. 22. That is to say, arcuate walls 110 of each array may be radially nested. Alternatively, the arcuate walls 110 of one array may be staggered with respect to an adjacent array, as shown in FIG. 23.

As shown in FIGS. 3, 7 to 9, the clamp member 24 extends around one end flange 44 of each body member 25, 40, 42 to thereby hold the body members 40, 42 and stiffening member 50 together. The clamp member 24 comprises radially inwardly extending flanges 54 at either end which are configured to capture the radially outwardly extending flanges 44 of the body members 40, 42 to thereby hold the body members 40, 42 and stiffening member 50 together. The radially inwardly extending flanges 54 are complementary in shape and size to the flanges 44 of the body members 40, 42 and are spaced apart such that when the body members 40, 42 and the stiffening member 50 are assembled, the radially inwardly extending flanges 54 of the clamp member 24 fit around the radially outwardly extending flanges 44 of the body member 40, 42, to engage with the rear surface 47 of the radially outwardly extending flanges 44 to hold the body members 40, 42 together such that a continuous bore surface 36 is formed whilst allowing the body members 40, 42 to pivot relative to one another.

The extent to which the members 25 can pivot relative to one another is determined by the longitudinal spacing of the flanges 54 of the clamp member 24, the thickness and resilience of the stiffening member 50 and its castellations 90 and the depth/thickness of the radially outwardly extending flanges 44 of the body members 25, 40, 42.

The clamp member 24 comprises at least one pair of mating surfaces 60 which may be separated such that the clamp member 24 may be located, or removed from, around the body members 40, 42. As shown in FIGS. 3, 9 the clamp member 24 comprises two removable sections, 52a, 52b each having a pair of mating surfaces 60. The two removable sections 52a, 52b may be provided as half shells as shown in FIG. 9. That is to say the clamp member 24 may comprise two removable sections 52a, 52b, each having two pairs of mating surfaces 60, the mating surfaces 60 each defined by two splits in a longitudinal direction along the length of the clamp member 24. The clamp member 24 is provided with releasable engagement features configured to hold the mating surfaces 60 together, and to allow the mating surfaces 60 to be divided. In the example shown in FIGS. 8, 9, the releasable engagement features are provided as nuts 70, bolts 72 and washers 74. These extend through holes 76 which extend through the wall of the clamp member 24 at, or proximate to, the mating surfaces 60.

In use, a first body member 40 is fed onto the utility line 60, followed by a stiffening member 50 and a second body member 44. The first body member 40 and the second body member 42 are brought together to trap the stiffening member 50 therebetween. A clamp member 24 is provided around the first and second body members 40, 42 to thereby hold the body members 40, 42 and stiffening member 50 together, as shown in FIG. 7. Hence a housing 23 is formed around the utility line 16, where the housing 23 defines a substantially continuous bore surface 36 within which the utility line 16 is housed.

After each segment/element containing a pair of body members 40, 42, stiffening member 50 and clamp member 24 are assembled, a further stiffening member 50 is brought into contact with an end 45 of one of the body members 40, 42. A further body member 25 is then brought together with the further stiffening member 50, and a further clamp member 24 is placed around the radially outwardly extending flanges 44 of the adjacent body members to lengthen the housing structure 23. This process is repeated, building up the housing 23 piece by piece using body members 25 interspaced with stiffening members 50 fed along the utility line 16 and held together with clamp members 24 until the housing 23 is of the desired length, for example as shown in FIG. 2.

Figure 10:
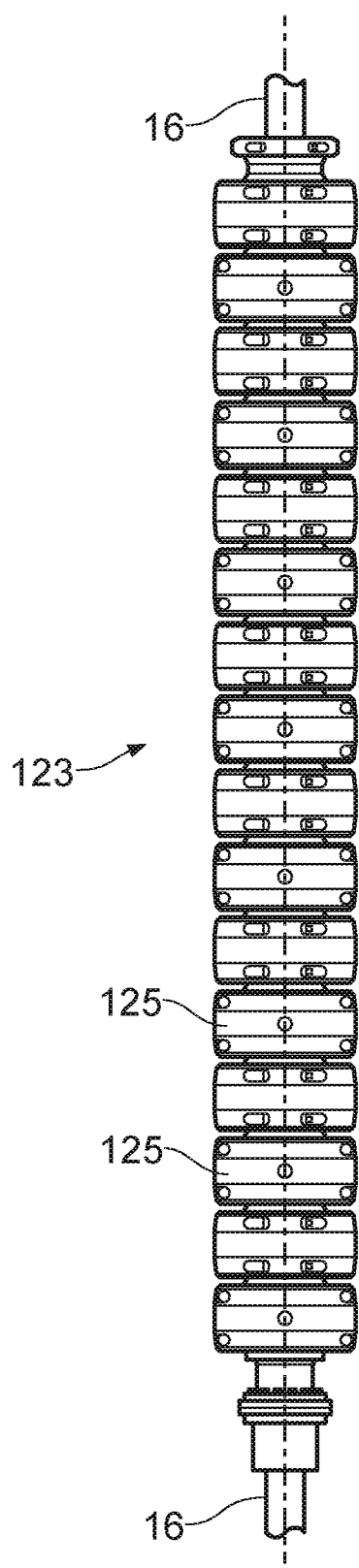
FIGS. 10, 11 show an assembled section of a housing according to another example of the present disclosure.
Figure 11:
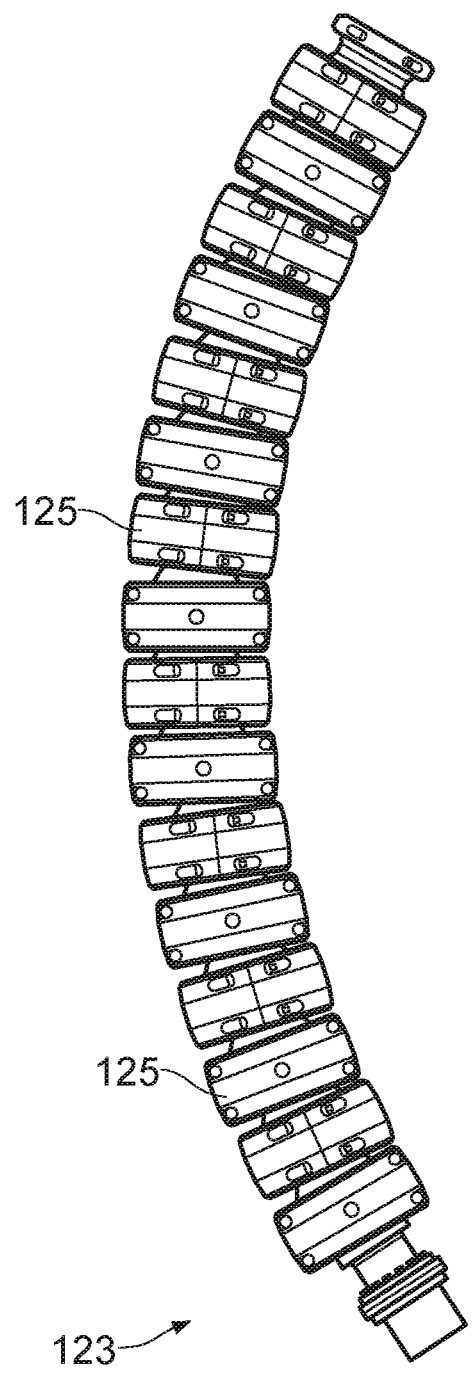

A further example of a protective housing assembly 123 which defines a bore 136 for receiving a utility line 16 is shown in FIGS. 10 to 20. The housing assembly comprises inter-lockable body members 125 to produce an assembly as shown in FIG. 10 which is operable to flex along its length as shown in FIG. 11. A section of the assembly is shown in FIGS. 12, 13 comprising a first body member 140 and a second body member 142 arranged adjacent to one another to define immediately adjacent sections of the bore 136 which surrounds the utility line 16 and a stiffening member 150 located between each of the first body member 140 and second body member 142. FIGS. 14, 15 show different views of the body members 125.

Figure 16:
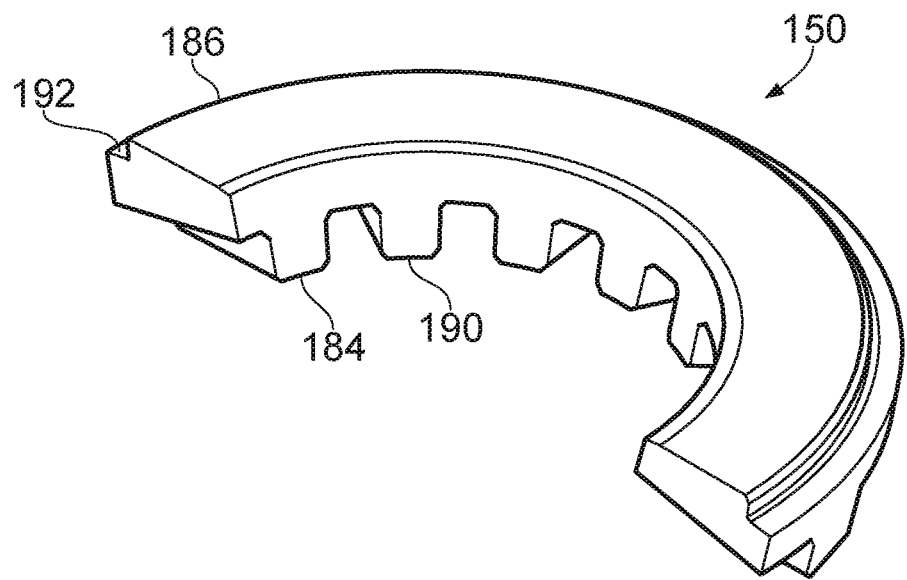
FIGS. 16, 17 show a perspective and side view of a stiffening member according to the example of FIGS. 10, 11.
Figure 17:
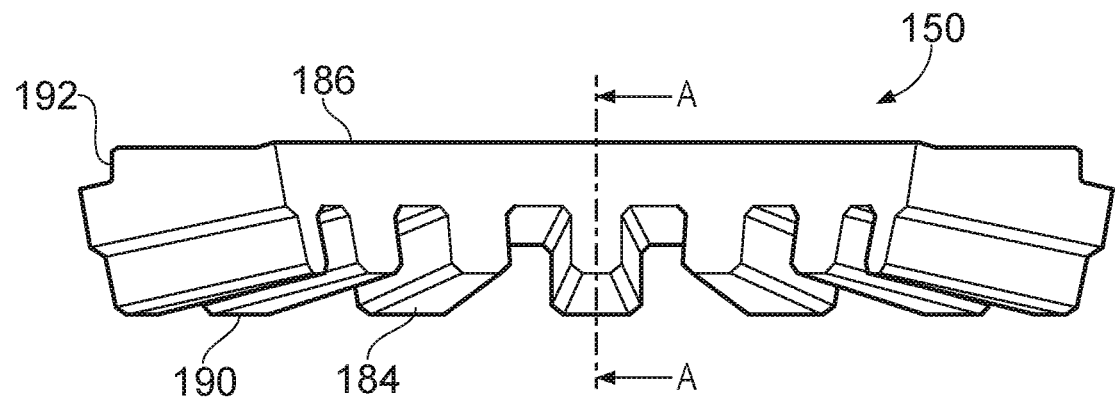
Figure 18:
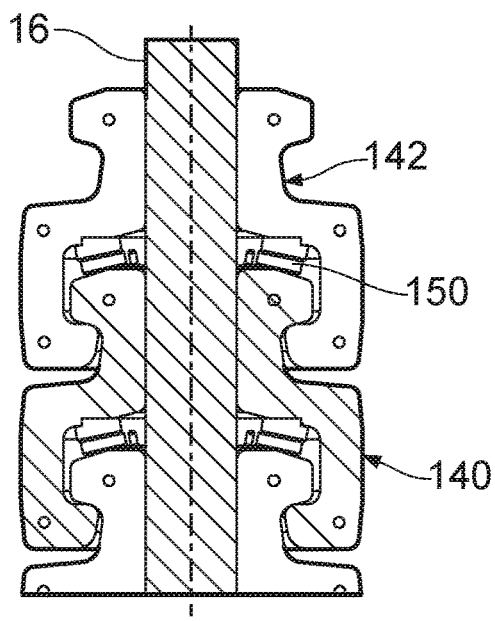
FIGS. 18 to 19 and 20 show enlarged views of different parts of the housing shown in FIGS. 10, 11.

Shown in FIGS. 16, 17, the stiffening member 150 comprises a first side 184 for engagement with the first body member 140, and a second side 186 for engagement with the second body member 142 wherein pedestals 190 extend from the first side 184 of the stiffening member 150 in a first direction away from the second side 186. In alternative examples the pedestals 190 may be provided in the form shown in FIGS. 21, 22, 23, as described previously. That is to say, the pedestals 190 may be provided as continuous half ring/circular walls 100, akin to that shown in FIG. 21, which extend in the first direction away from the second side 186. Alternatively the pedestals 190 may be provided as arcuate walls 110, spaced apart around the first side 184, akin to that shown in FIGS. 22, 23.

Shown in FIG. 16, in this example the stiffening member 150 may be provided as a ring segment configured to form a complete ring around the bore 136 of the housing 123 when assembled with at least one other similar stiffening member segment 150. That is to say, the stiffening member segment 150 shown in FIG. 16, when assembled with other stiffening member segments 150, would form a complete ring stiffening member 150 (i.e. akin to that shown in FIG. 4). In the example of FIGS. 10 to 20, the stiffening member 150 is provided as a half ring segment, thus is used in conjunction with a further half ring segment to form a complete ring. Hence one or more stiffening member segments 150 may be provided between the first body member 140 and second body member 142 of the example shown in FIGS. 10 to 20 of the present disclosure. Therefore, when the pedestals are provided as shown in FIG. 21, they may be provided as continuous half ring/circular walls 100 i.e. extending in a semi-circle rather than a full circle on each segment 150, but forming a full circle when the segments are assembled, akin to that shown in FIG. 21. Likewise when the pedestals are provided as shown in FIGS. 22, 23, the arrays of arcuate walls 110 may form half ring or half circular shape, i.e. extending in a semi-circle on each segment rather than a full circle, but forming a full circle when the segments 150 are assembled, akin to that shown in FIGS. 22, 23.

In this example, the second side 186 of the stiffening member is substantially planar, where planar is taken to mean substantially smooth and/or flat. That is to say, the second side 186 of the stiffening member 150 is not provided with any pedestals, and hence is relatively smooth compared to the first side 184.

The second side 186 of the stiffening member 150 is provided with a seating shoulder 192 for engagement with a seating recess 194 provided in each body member 140, 142.

In this example the body members 140, 142 are provided with an outwardly projecting flange 144 at one end, and an inwardly projecting flange 154 at the other end which forms a cavity 156. That is to say, the inwardly projecting flange 154 provides an opening to a cavity 156 provided in each of the body members 140, 142. When assembled, the stiffening member 150 is located between, and in contact with, the end of the outwardly projecting flange 144 of one body member and a surface 196 of the cavity 156 of the other body member, the surface 196 being spaced apart from the inwardly projecting flange 154. The inwardly projecting flange 154 is configured to extend around the outwardly projecting flange 144 such that the outwardly projecting flange 144 of one body member 140, 142 sits in the cavity 156 of the other body member 140, 142 to thereby hold the body members 140, 142 and stiffening member 150 together.

The cavity surface 196 comprises a seating recess 198 (or region) configured to receive the stiffening member seating shoulder 192. That is to say there is a receiving region 162 which is configured to provide a surface which the stiffening member 150 fits against. Optionally the receiving region 162 may be configured to locate the stiffening member 150.

Each of the body member 140, 142 comprises at least one pair of mating surfaces 160 which may be separated such that said body member 140, 142 may be located, or removed from, around the other body member 140, 142.

The body member 140, 142 comprises two removable sections 152*a*, 152*b*, each having a pair of mating surfaces 160.

As described in relation to the example of FIGS. 2 to 9, each body member 140, 142 is provided with releasable engagement features (nuts, bolts and washers) which extend through holes 176 which extend through the wall of the body members 140, 142 at, or proximate to, the mating surfaces 160, and thereby hold the mating surfaces 160 together, and to allow the mating surfaces 160 to be divided.

In use a half of a first body member 140 is offered up to the utility line 16, and then the other half of the first body 140 is bolted to the first half. A second pair of body members 142 is then bolted around the outwardly extending flange 144 of the first body member 140, with stiffening members 150 in place between the end of the first body member 140 and the cavity surface 196 of the second body member 142. This process is repeated until the housing 123 is formed of a required length. Hence a housing 123 is formed around the utility line 16, where the housing 123 defines a substantially continuous bore surface 36 within which the utility line 116 is housed.

Figure 19:
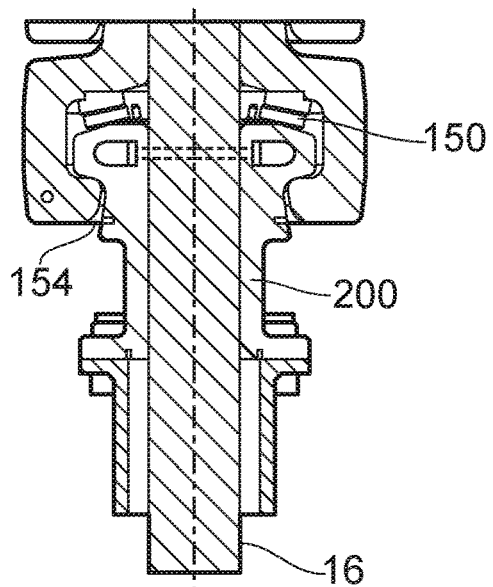
Figure 20:
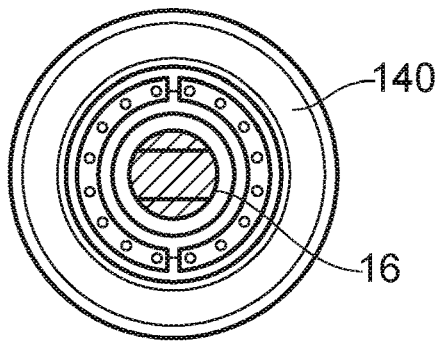

As shown in FIG. 19, the inwardly extending flanges 154 may also be used to capture other parts of the housing 123, for example an end sleeve/anchor unit 200.

In both examples the method of assembly is substantially similar, and comprises the steps of providing a utility line, bringing the first body member and second body member together to trap the stiffening member therebetween, and hold the body members and stiffening member together and thereby provide the housing around the utility line.

As described above, with reference to both examples, the body members 40, 42, 140, 142 are able to pivot slightly relative to one another (as shown, for example, in FIGS. 11, 12) but their movement is restricted by the interlocking flanges which hold them together. Additionally their relative movement is restricted by the stiffening member 50, 150. The stiffening member 50, 150, being resilient, limits the rate of change of angle of the body members 40, 42, 140, 42 relative to one another, as its compression introduces a lag into the speed with which the body members 40, 42, 140, 142 can move relative to one another. Also, merely by being located between, and in contact with, the body members 40, 42, 140, 142 the stiffening member restricts the extent to which the body members 40, 42, 140, 142 can pivot relative to one another.

In both examples, the stiffening member 50, 150 is made from a resilient material having a hardness which is less than the hardness of the body members 40, 42, 140, 142.

The stiffening member 50, 150 may have a hardness in the region of 10 to 80 kNm.

The body members 40, 42, 140, 142 and stiffening member 50, 150 are unitary in nature, that is to say they made as one piece. Hence they are relatively easy to manufacture compared to examples of the related art, and also are inherently stronger as they are formed in one piece, albeit with a split for assembly. Thus assembly is relatively straightforward, with only minimal joining required to join body members.

As is understood in the art, joining fixtures (e.g. bolted nuts) for this application are expensive to produce, and any join introduces an inherent weakness into a structure. Hence the arrangement of the present disclosure is cheaper to make, is more robust, and is easier to assemble than examples of the related art because it uses a smaller number of joining fixtures.

As the body members 25, 40, 42, 140, 142 react against one another via the stiffening member 50,150 are inherently more restricted in their range of motion than examples of the related art. This provides for an overall stiffer structure which will therefore protect and reduce loads on the utility line to a greater extent than examples of the related art.

Hence the arrangement of the present disclosure is inherently easier to assemble, more robust, more likely to protect the utility line, and cheaper to manufacture than examples of the related art.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A stiffening member for a protective housing assembly which defines a bore for receiving a utility line, the housing assembly comprising a first body member, and a second body member arranged adjacent to one another to define immediately adjacent sections of the bore which surrounds the utility line, the stiffening member comprising:
    a first side for engagement with the first body member; and
    a second side for engagement with the second body member, wherein the second side of the stiffening member is substantially planar and is provided with a seating shoulder for engagement with a seating recess provided in the first body member;
    wherein at least one pedestal extends from the first side of the stiffening member in a first direction away from the second side, and wherein the stiffening member is made from a resilient material having a hardness less than a hardness of the first body member or the second body member.

2. The stiffening member as claimed in claim 1, wherein at least one pedestal extends from the second side of the stiffening member in a second direction away from the first side.

3. The stiffening member as claimed in claim 2, wherein each of the at least one pedestal on the first side or the second side of the stiffening member is aligned with one of the at least one pedestal on the other of the first side or the second side of the stiffening member.

4. The stiffening member as claimed in claim 1, wherein the stiffening member is provided as a ring segment configured to form a complete ring around the bore of the housing when assembled with at least one other stiffening member.

5. The stiffening member as claimed in claim 4, wherein the at least one pedestal is provided as a radially extending tooth member.

6. The stiffening member as claimed in claim 5, wherein the at least one pedestal is evenly spaced around the first side of the stiffening member.

7. The stiffening member as claimed in claim 4, wherein each of the at least one pedestal is provided as a wall which extends in an arc or a circle around the first side of the stiffening member.

8. The stiffening member as claimed in claim 1, wherein the stiffening member is ring shaped.

9. A protective housing assembly which defines a bore for receiving a utility line, the housing assembly comprising a first body member, and a second body member arranged adjacent to one another to define immediately adjacent sections of the bore which surrounds the utility line, and the stiffening member according to claim 1 located between each of the first body member and the second body member.

10. The protective housing as claimed in claim 9, wherein:
    the body members are provided with an outwardly projecting flange at each end;
    the stiffening member is located between, and in contact with, one end of each body member; and
    the housing further comprises a clamp member which extends around one end flange of each body member to thereby hold the body members and stiffening member together.

11. The protective housing as claimed in claim 10, wherein at least one of the first body member or the second body member comprises a continuous wall which defines the bore and the outwardly projecting flanges.

12. The protective housing as claimed in claim 10, wherein the clamp member comprises radially inwardly extending flanges configured to capture the radially outwardly extending flanges of the first body member and the second body member to thereby hold the first body member and the second body member and the stiffening member together.

13. The protective housing as claimed in claim 10, wherein the clamp member comprises at least one pair of mating surfaces which may be separated such that the clamp member may be located, or removed from, around the first body member and the second body member.

14. The protective housing as claimed in claim 13, wherein the clamp member comprises two removable sections each having a pair of mating surfaces.

15. The protective housing as claimed in claim 14, wherein the clamp member is provided with releasable engagement features configured to hold the pairs of mating surfaces together, and to allow the pairs of mating surfaces to be divided.

16. The protective housing as claimed in claim 9, wherein:
   the first body member and the second body member each are provided with an outwardly projecting flange at one end and an inwardly projecting flange at their other end which defines an opening to a cavity within the body member;
   the stiffening member is located between, and in contact with, the end of the outwardly projecting flange of one of the first body member or the second body member, and
   a surface of the cavity is spaced apart from the inwardly projecting flange of the other of the first body member or the second body member; and
   the inwardly projecting flange is configured to extend around the outwardly projecting flange such that the outwardly projecting flange of one of the first body member or the second body member sits in the cavity of the other of the first body member or the second body member to thereby hold the first body member and the second body member and the stiffening member together.

17. The protective housing as claimed in claim 16 wherein the second side of the stiffening member is provided with a seating shoulder for engagement with a seating recess provided in the first body member, and the cavity surface comprises a seating recess configured to receive the stiffening member seating shoulder.

18. The protective housing as claimed in claim 16, wherein each of the first body member and the second body member comprise at least one pair of mating surfaces which may be separated such that the first body member or the second body member may be located, or removed from, around the other of the first body member or the second body member.

19. The protective housing as claimed in claim 18, wherein each of the first body member and the second body member comprises two removable sections, each removable section having a pair of mating surfaces.

20. The protective housing as claimed in claim 19, wherein each of the first body member and the second body member is provided with releasable engagement features configured to hold the pairs of mating surfaces together, and to allow the pairs of mating surfaces to be divided.

21. A method of assembling a protective housing as claimed in claim 9 for a utility line, the method comprising:
   providing a utility line;
   bringing the first body member and the second body member together to trap the stiffening member therebetween; and
   holding the first body member and the second body member and the stiffening member together to thereby provide the protective housing around the utility line.

* * * * *